Figure 1:
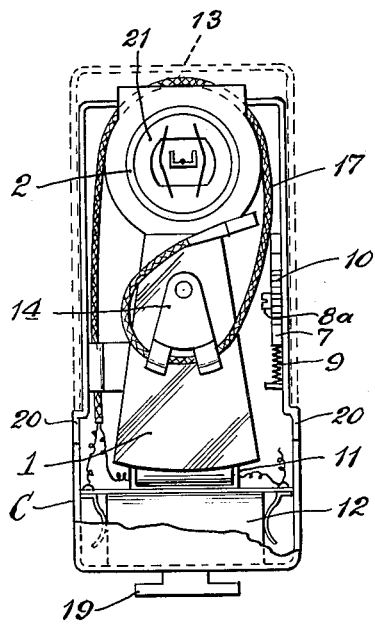

Jan. 9, 1962 W. H. VAN DER MEI 3,016,453

FLASHGUNS

Filed July 7, 1958 2 Sheets-Sheet 1

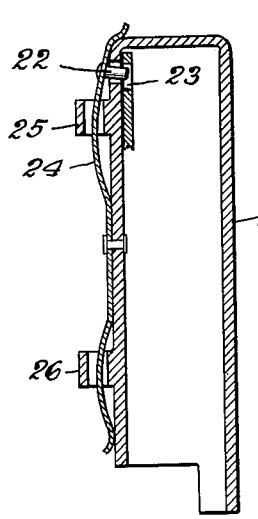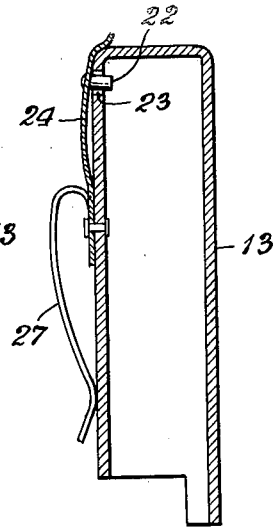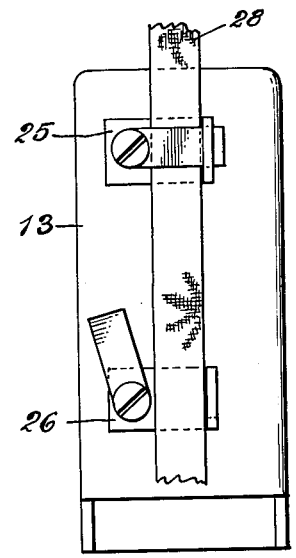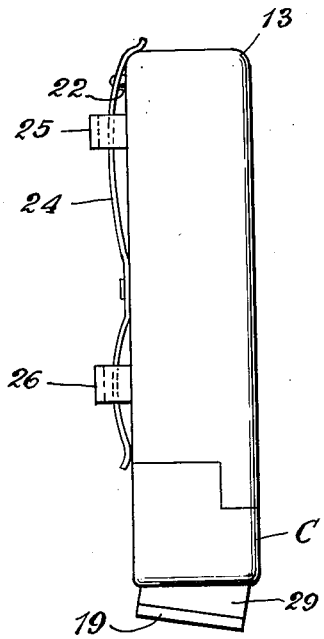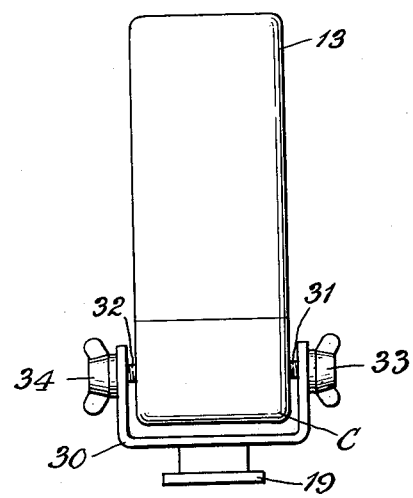

United States Patent Office 3,016,453
Patented Jan. 9, 1962

---

3,016,453
FLASHGUNS
Wietse Hendrik van der Mei, Buderich, near Dusseldorf, Germany, assignor to Zeiss Ikon A.G. Stuttgart, Stuttgart, Germany
Filed July 7, 1958, Ser. No. 747,079
Claims priority, application Germany July 10, 1957
1 Claim. (Cl. 240—1.3)

The invention relates to improvements in flashguns and particularly is directed to flashguns provided with a foldable fan-like reflector, composed of a number of sectors.

Flashguns of this type have the advantage that in the folded condition of the reflector, they require very little space and, therefore, can very easily be carried and transported.

The casing of the flashgun heretofore was given a shape which required substantially more space as would be necessary for accommodating the folded reflector alone, because the casing was also used for the reception of accessory parts, for instance for accommodating a source of current such as a battery, or for accommodating an electric cable or replacement lamps. Even though the shape of the device was very convenient and small, it nevertheless had certain disadvantages which will be pointed out in the following:

It is no longer customary to attach flashguns with a separate holding bracket to the camera, but the flashgun in most cases is now provided with a plug-like foot which is inserted into an accessory shoe provided on the camera. It is well known that the dimension of most photographic cameras in the direction of the optical axis is very small. When viewing through the finder, the space above the camera is taken up in part by the forehead of the photographer. Therefore, flashguns which may be inserted into the accessory shoe are annoying because they extend too far in the direction of the optical axis. Also the vertical dimensions of the flashgun which are increased beyond the length required by the reflector sectors in view of the accommodation of the accessory parts, are able to restrict the view of the photographer towards the object to be photographed. Flashguns are also known in which the width of the casing corresponds somewhat to the width of the individual sectors of the reflector. In this manner one obtains a very flat construction of the flashgun and one obtains also a very convenient size, except that the casing extends in the direction of the optical axis of the reflector a rather great distance. This increases in the direction of the optical axis is due to the accommodation of the mentioned accessory parts and the result is that the width of the casing of the flashgun will be a multiple of the thickness of the camera casing so that the observation of the finder image is no longer possible.

It is an object of the present invention to overcome the above mentioned disadvantages in that the inner dimensions of the cross-section of the casing are selected in such a manner as to hold substantially only the collapsed sectors of the reflector with the socket for the flash bulb. The inner dimensions of the casing are selected to correspond not only to the width of the collapsed reflector sectors, but also the depth of the casing is selected so that only the collapsed reflector sectors with their socket fit into the casing.

If the flashgun is provided with its own source of current, comprising for instance of a battery and a condenser, then the battery and the condenser will be stored in an extension below or above the folded reflector sectors without enlarging the cross section of the casing. The same enlarged ends of the casing can also be used for storing of other accessory parts.

For the purpose of unfolding the collapsed reflector sectors the side walls of the casing are provided with suitable cut outs. The cut outs as well as all other uncovered surfaces of the reflector are covered with a cover, slidably fastened to the casing, to protect the reflector sectors when not in use.

Flashguns of the claimed type can easily be stored or carried in pockets and the like. It is also possible to fasten the flashgun to the carrying belt of the carrying case of a camera without hindering action. For this reason the flashgun casing is provided with a releasable holding loop or the like into which the carrying belt can be inserted without the necessity of threading the belt through a closed loop. The flashgun casing can also be provided with a clip by means of which the casing can be fastened anywhere on the clothing.

The above mentioned fastening means can also be attached to the cover of the flashgun casing in a way that such a fastening device is attached permanently to the cover. In case such a cover has a form of a removable cap which covers a major portion of the casing, the casing can be removed by merely pressing a release spring on the cap. Then bring the reflector sectors in position by unfolding and the flashgun is ready for use.

Even though the requirement for optical exactness cannot be too high for a reflector of a flashgun it is essential to give the reflector a certain curvature to concentrate the light produced by the flashbulb to a limited space. It is known in the art to form a curved reflector out of plane fan sectors, but this requires additional devices on the gun for changing the opened reflector sectors to the necessary curvature. This proved to be rather difficult and time consuming. Therefore, one employs now only reflector sectors which have the required curvature. The fitting of such curved reflector sectors into a housing could give cause to broaden the casing according to the curvature of the sections. This would be against the object of the present invention since the curvature of the reflector sectors takes place in the direction of the optical axis which is to be avoided.

The outwardly and inwardly tilting of the stacked reflector sectors could be done manually, which means that the uppermost reflector sector which may be provided with an operating knob for unfolding the sectors, would be used also for this tilting operation. This could cause damage or breakage of the upper reflector sector, because the diameter cross section of this single sector is rather small.

According to another object of the present invention the inwardly and outwardly tilting movement of the stacked reflector sectors is done by a control device comprising for instance a bar slidably mounted on a wall of the casing, which bar is provided with an inclined face or cam face which engages the pivoted plate of the stack of reflector sectors from below. The bar and the plate are subject to spring tension to insure an operative connection.

In a preferred embodiment of the invention the pivoted plate is provided with a cam disc which under spring pressure engages an inclined face in the guide of the cover when the latter is put on the flashgun casing. When the cover is removed, the stack of the reflector sectors tilt into operative position under spring pressure. When the reflector sectors are folded into inoperative position and the cover is replaced, then the inclined face urges the stack of the reflector sectors against spring pressure into the casing.

It is also contemplated to provide a separate cover for the space in the housing containing the battery so that the same can be exchanged while the rest of the casing is still covered. The same arrangement can be made for the other space provided to contain other accessories.

In order to also provide space within the casing for the ejector, there is provided an elastic tongue slidably attached to the rear wall of the casing.

Figure 2:
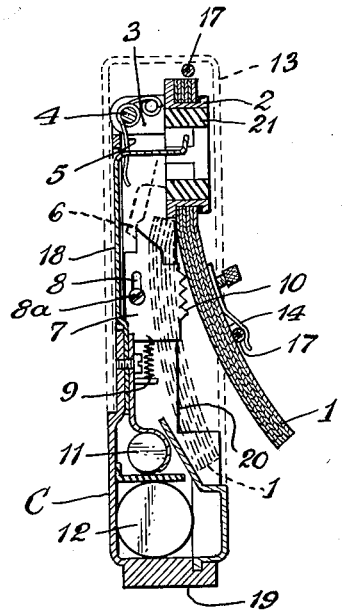
Figure 3:
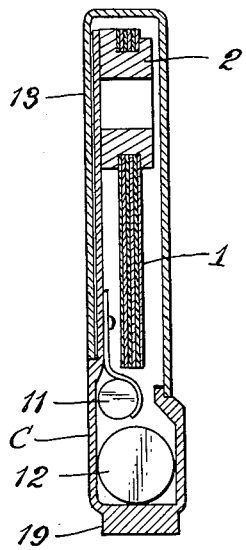
Figure 4:
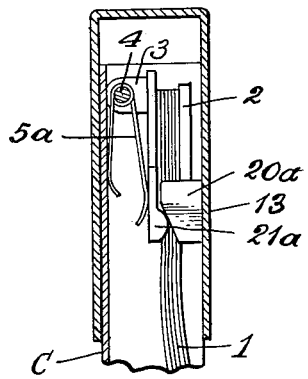

The invention is illustrated in the drawings as follows:

FIG. 1 is a front view of a flashgun of the present invention,

FIG. 2 is a longitudinal cross-sectional view of the flashgun with the cover shown in dotted lines, FIG. 3 is a side elevation view of a modified flashgun with cover in place, FIG. 4 illustrates a control device for the tilting of the stack of reflector sectors in another embodiment of the invention, FIG. 5 to FIG. 9 illustrate each additional details which may be added to the cover or the casing of the flashgun.

In FIGS. 1 and 2 there is illustrated a flashgun equipped with curved reflector sectors. The stack of sectors 1 is mounted on a sleeve 2. This sleeve 2 is fixedly attached to a plate 3 which can be tilted about the pivot axis 4. The pivot axis 4 is formed by a pin mounted in the upper portion of the casing C at right angles to the axis of the sleeve 2. The side walls of the casing C are provided with cut outs 20 to permit an unfolding of the stack of sectors 1 to form a circular reflector. The spring 5 urges the stack of sectors 1 into the operative position, shown in full lines in FIG. 2, when the control cam 6, fixedly connected with the sleeve 2 is released by the latching plate 7. As will be seen in FIGURE 2 the upper end of the plate 7 is fashioned to form a detent which engages in a correspondingly shaped notch in the control cam 6 carried by the sleeve 2 to hold the reflector assembly in a retracted position against the action of the spring 5. The latching plate 7 is slidably mounted on one side wall of the casing and its movement is limited by the slot 8 in the plate 7. The slot 8 is traversed by a pin or screw 8a. The plate 7 is held in its upper end-position by the pressure spring 9. By means of the row of projections 10, extending over the edge of the side wall, the latching plate 7 may be moved manually against the action of the spring away from its locking position.

The invention is not limited to the described construction, for instance a particular point of tilting of the movable stack of reflector sectors may be selected in connection with a suitable arrangement of the plate 3 and then it is possible that the stack of reflector sectors in its inoperative position utilizes the respective cross section of the casing in a manner as illustrated in FIG. 3.

The source of current for the flashgun consists of a condenser 11 and a battery 12, which are stored in an extension of the casing or in a space not being utilized by the stack of the reflector sectors when tilted into the casing, particularly when the sectors are curved.

In case the space within the casing is fully utilized by the stack of the reflector sectors, then the casing can be made somewhat longer, without changing its cross section, so that the source of current can be stored in such a casing extension as shown in FIG. 3.

A cover 13 is slidably moved over the top portion of the casing after the stack of the reflector sectors has been tilted into the casing. The uppermost reflector sector carries a clip 14 to receive the cable 17 which also is placed around the hub portion formed by the central portions of the reflector sectors.

For operating the bulb ejector, which in known manner is installed in the bore of the sleeve 2, which latter in turn has mounted therein the lamp socket 21, a leaf spring 18 is used which is attached to a wall of the casing. The free end of this spring 18 is bent at a right angle and engages in a suitable manner the wall of the socket 21. When a flash bulb is inserted into the socket 21 the spring 18 is flexed outwardly (toward the left in FIG. 2) and when thereafter the spring 18 is manually pressed towards the rear wall of the casing (toward the right) the bulb is pushed from the socket 21. The casing is also provided with a plug-like foot which is used for attaching the flashgun to the accessory shoe on the camera.

According to the modified embodiment of FIG. 4, the curved reflector sectors 1 are rotatably supported on the sleeve 2 as before and the plate 3 is pivoted to the casing on the pin 4. The cover 13 carries a control plate 20a which cooperates with a locking cam 21a which is fixedly attached to the sleeve 2 of the stack of reflector sectors 1. The spring 5a which is wound around the pivot pin 4, engages with one end a wall of the casing and with its other end rests against the locking cam 21a. Upon removal of the cover 13 from the casing, this spring 5a automatically tilts the stack of reflector sectors into its operative position, in the same manner as is shown in full lines in the embodiment of FIG. 2. If the cover is being moved over the flashgun casing, the control plate 20a engages the cam 21a and rocks the plate 3 on its pivot 4 to urge the stack of reflector sectors into the casing against the yielding action of said spring 5a in the same manner as is shown in dotted lines in the embodiment of FIG. 2. In FIG. 4 the cover 13 is only partly moved downwardly and has not as yet tilted the sleeve 2 and the reflector sector stack thereon.

The described embodiments of the invention show that the requirement to reserve the cross sectional area of the casing diameter almost exclusively for the stack of reflector sectors makes a small depth of the casing possible, but that the same result is reached even if additional elements are employed, which permit a tilting of the stack of reflector sectors into the same casing cross section. Essential for the invention is that the accessory parts, such as the battery, can be stored in the same cross section of the casing, which is occupied by the stack of reflector sectors.

To securely attach the cover 13 to the casing the cover is provided with a pin 22 (FIGS. 5, 6, and 8) which enters a hole 23 in the casing under the action of a spring 24 arranged on the outside of the cover 13. The cover 13 is provided at its rear wall with loop-shaped members 25 and 26 for receiving a carrying belt 28 (FIG. 7). According to FIG. 6 the cover 13 is provided on its rear wall with a clip 27 so that the entire flashgun can be fastened either in a button hole or a pocket of the clothing. The loop-shaped members 25 and 26, according to FIG. 7, are provided with releasable portions so that the carrying belt 28 can be placed laterally into the loop and need not be threaded lengthwise through the same.

To bring the axis of the reflector of the flashgun in the desired alignment with the optical axis of the camera objective, it may be desirable to arrange the plug-like foot 19 on the flashgun casing at an angle to the camera casing, as shown at 29 in FIG. 8.

The adjustment of the flashgun and its reflector with reference to the optical axis of the camera may be effected also by attaching the plug-like foot 19 according to FIG. 9, to the outer part of a U-shaped bracket 30 and securing the flashgun between the two free legs of the bracket. For this purpose the screws 31 and 32, the heads of which consist of wings 33 and 34, permit a fastening of the screws.

What I claim is:

In a flashgun for photographic use, an elongated casing having side and end walls providing an opening in the front thereof, a sleeve rockably mounted in one end of said casing to tilt about an axis extending at right angles to the axis of the sleeve, a lamp socket in said sleeve adapted to receive the base of a photo flash bulb, a series of sector-shaped reflector units each provided with an opening in their reduced ends rotatably mounted on the outer surface of said sleeve, said reflector sectors when in stacked relation being of dimensions to be compactly received in said casing, means for retaining said reflector sectors in a folded compact position in said casing, means for yieldingly urging said sleeve and reflector sectors to a tilted position in which the reflector sectors are projected through said opening in said casing and outwardly of said casing a sufficient distance to permit the same to be unfolded by being angularly displaced about the axis of the sleeve to form a circular reflector, the side walls of said casing being cut away to provide sufficient clearance when folding and unfolding said reflector sectors, a cover removably mounted on one end of said casing and adapted to be slipped over said one end thereof to enclose said sleeve and reflector sectors, a control plate on one of the internal walls of said cover engaging a locking cam attached to said sleeve to urge the stack of reflector sectors into a retracted position and compactly contain the same within said casing and cover.

References Cited in the file of this patent

UNITED STATES PATENTS

| | | |
|---|---|---|
| 1,269,904 | Cathrill | June 18, 1918 |
| 1,875,650 | Pemberton et al. | Sept. 6, 1932 |
| 2,555,871 | Caggiano | June 5, 1951 |
| 2,780,720 | Bertrams | Feb. 5, 1957 |
| 2,876,337 | Fischer | Mar. 3, 1959 |
| 2,898,448 | Smith | Aug. 4, 1959 |

OTHER REFERENCES

Germany, App. Ser. No. K 24286, printed Feb. 2, 1956 (Kl. 57c 3).

Germany, App. Ser. No. F 16362, printed Apr. 12, 1956 (Kl. 57c 3).